Oct. 25, 1938.  H. LENTZ ET AL  2,134,466
COMPOUND STEAM ENGINE
Filed Jan. 29, 1937  7 Sheets-Sheet 1

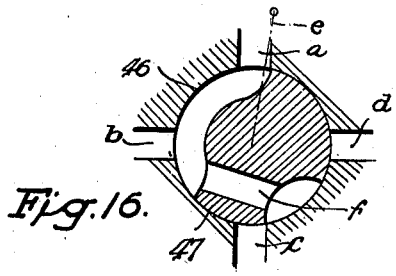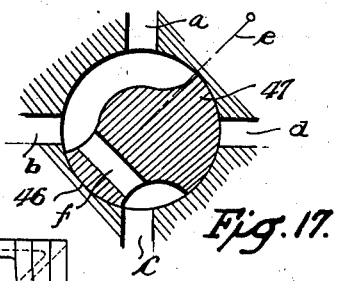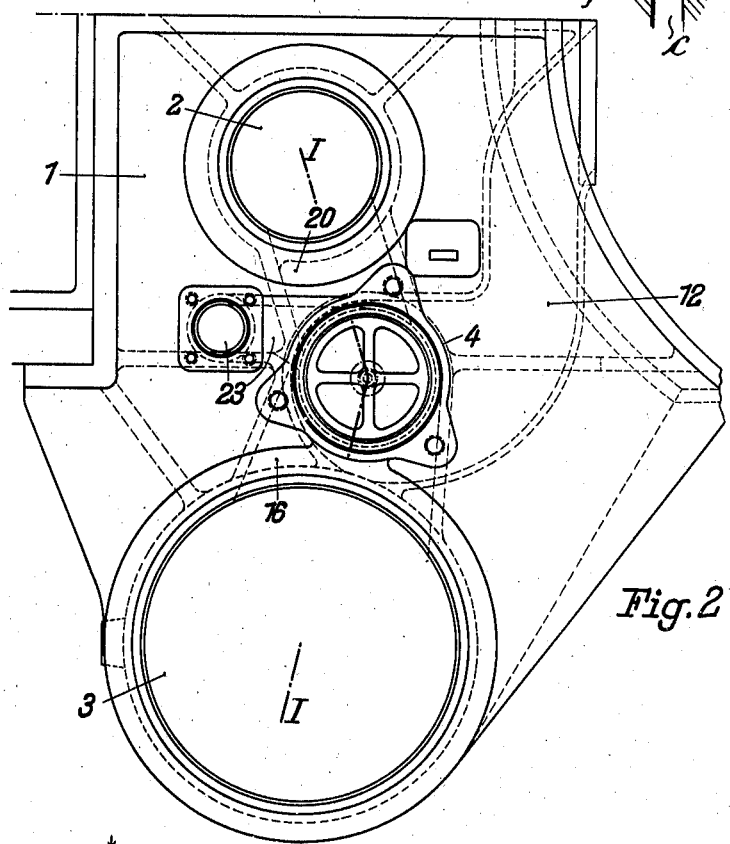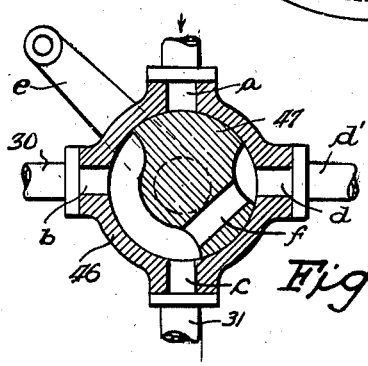

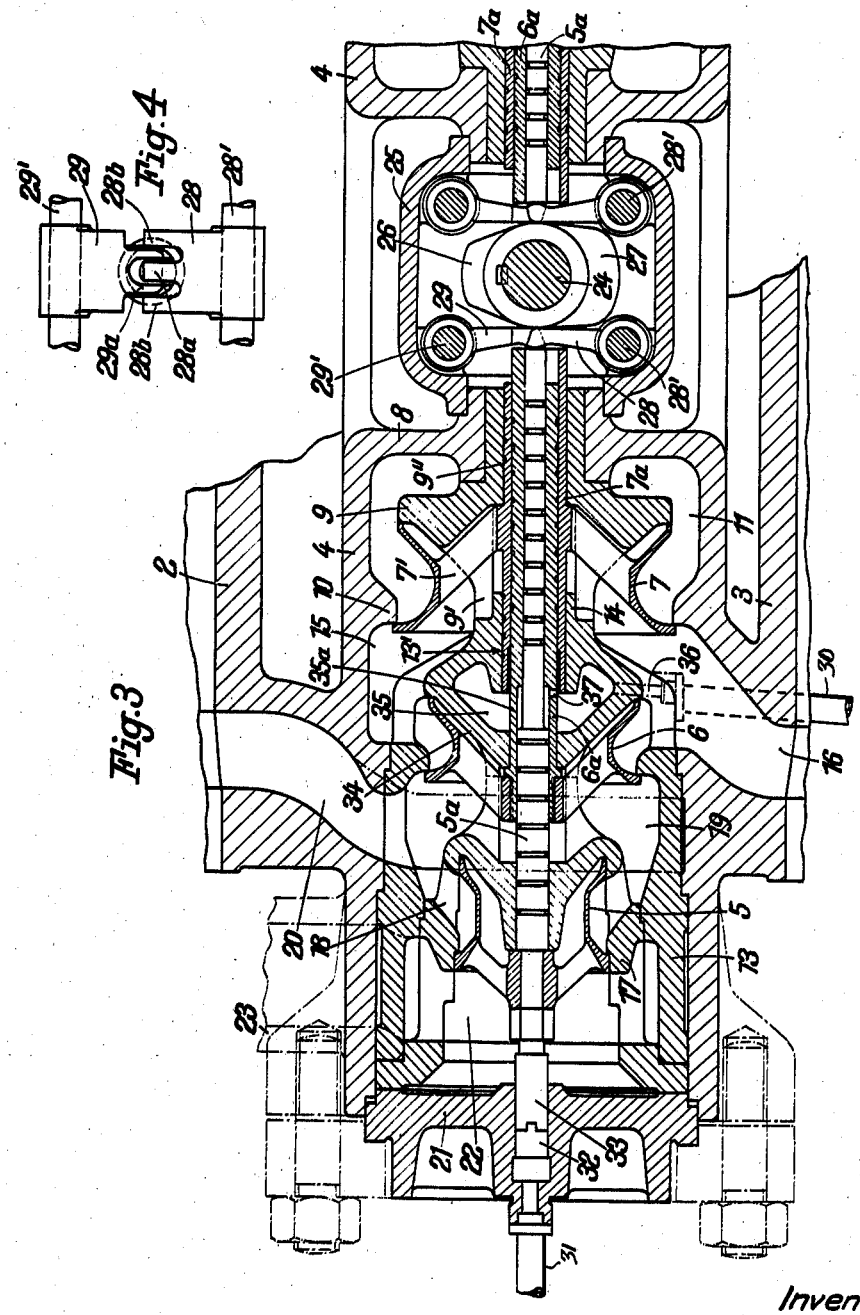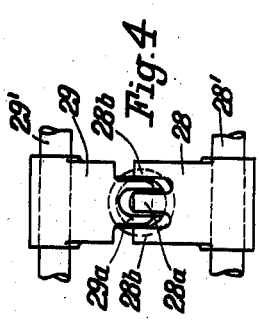

Oct. 25, 1938.

H. LENTZ ET AL 2,134,466

COMPOUND STEAM ENGINE

Filed Jan. 29, 1937

Inventor:

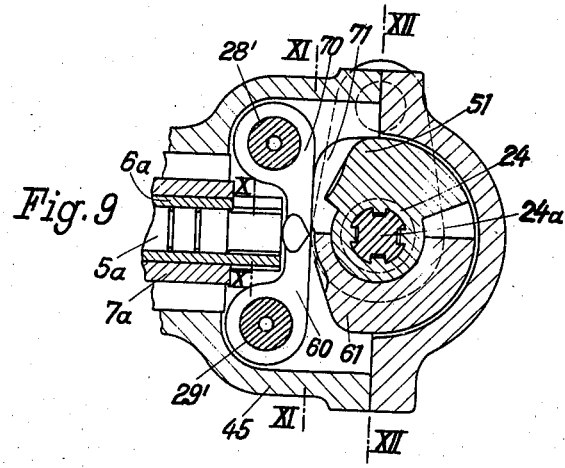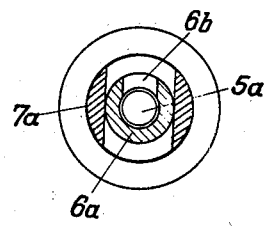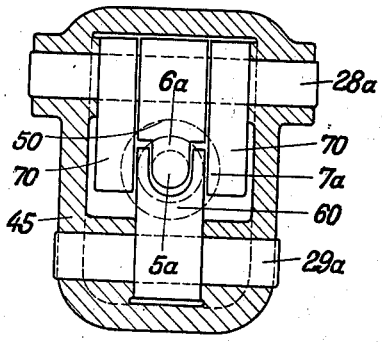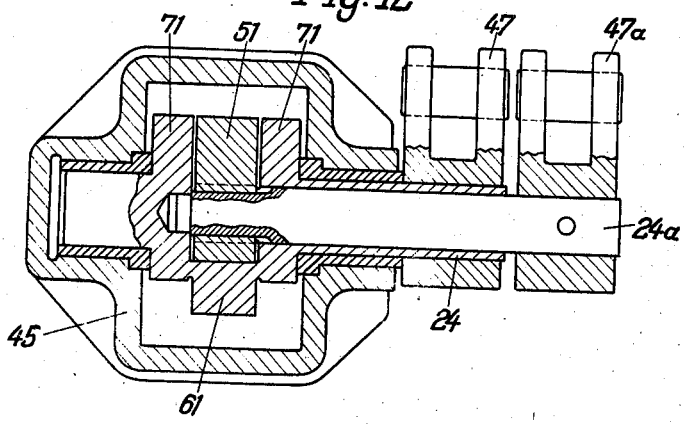

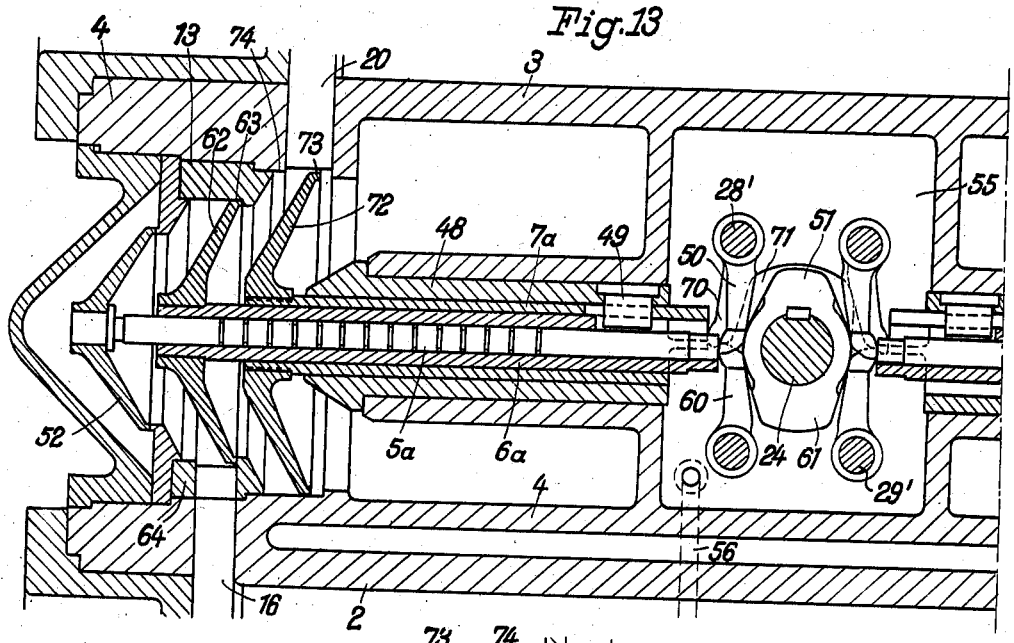
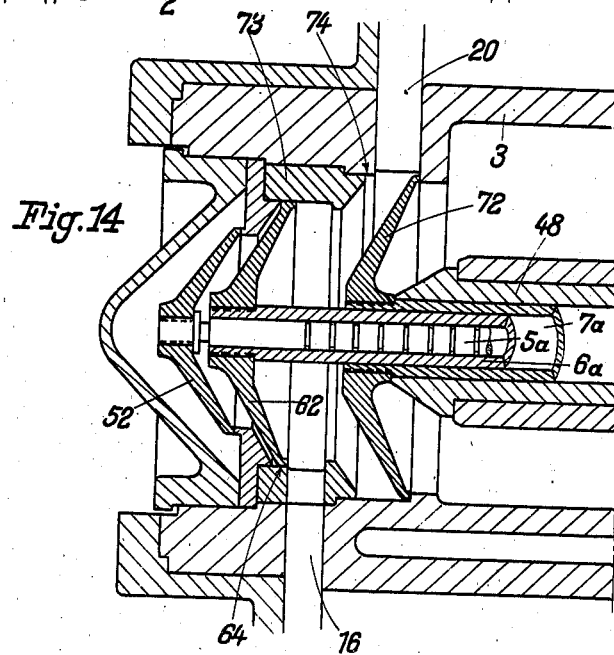

Patented Oct. 25, 1938

2,134,466

UNITED STATES PATENT OFFICE 2,134,466

COMPOUND STEAM ENGINE

Hugo Lentz, Berlin, Germany, and Hugo Johannes Lentz, Vienna, Austria

Application January 29, 1937, Serial No. 122,994
In Germany January 29, 1936

7 Claims. (Cl. 121—102)

Compound steam engines of the Woolf type with poppet valve gear are known, in which these valves are arranged side by side at each end of the cylinder block and in which each of the valves is controlled by a separate cam. However, the object of this arrangement, namely to keep the steam passages short and the clearance small, is not entirely attained.

It is likewise known, in connection with single cylinder steam engines, to construct the two control valves with spindles located the one within the other at each end of the cylinder, to thus arrange them coaxially one behind the other and control them by a common cam.

The invention goes still farther, in that in compound steam engines of the Woolf type a combined cam controls the sets of valves arranged at each end of the cylinder block between high pressure and low pressure cylinders, each set comprising three coaxial valves arranged one behind the other with their spindles mounted one within the other. By this arrangement an extremely compact construction of the valves and consequently a considerable reduction in the clearing is obtained but at the same time the whole gear drive is considerably simplified.

The combined cam serving for controlling the sets of valves can have all three control surfaces for the admission, bypass and exhaust, in which instance it is driven by a cam shaft. It is then possible to use the control surfaces for the exhaust also for controlling the admission; if the admission valve is constructed as piston slide valve so that it opens later than the exhaust valve. The combined cam can, however, be also constructed as a two-part cam, one part having the control surfaces for the admission and the second part the control surfaces for bypass and exhaust, each part being driven by a separate shaft.

The combined cam for controlling both sets of valves can be arranged in the middle of the cylinder, in which case the valve spindles mounted one within the other are directed the one against the other. The valve spindles may, however, also be outwardly directed, in which case a combined cam is arranged on each end of the valve chest. This arrangement presents the advantage that in the case of repairs being necessary each set of valves can be removed as a whole and replaced by a new set.

For closing the valves an elastic pressure medium (for example steam) acting on the valve spindles is employed, which medium, however, enables in the new arrangement the admission valves for the high pressure to open separately when starting so that the live steam is immediately fed to the low pressure cylinder and there develops a high pulling moment until the normal running can begin.

Several embodiments of the invention are illustrated by way of example in the accompanying drawings, in which:—

Fig. 2 is an end view of the cylinder block on larger scale.

Fig. 3 shows on larger scale and in longitudinal section the valve chest situated at one end of the cylinder block with built-in valve set.

Fig. 4 shows the intermediate levers in side elevation.

Figs. 9 to 12 show a cam drive, in which the admission cam is arranged adjustable relatively to the exhaust cam and separately driven.

Fig. 13 shows a section through the valve chest of another form of construction of gear employing single seat valves.

Fig. 14 is a similar section with open by-pass valve.

Fig. 15 is a section showing a control valve for the closing steam in the position corresponding to coasting of the engine.

Figs. 16 and 17 are diagrams showing, respectively, the position of the control valve for starting the engine and for closing all valves.

Figure 1:
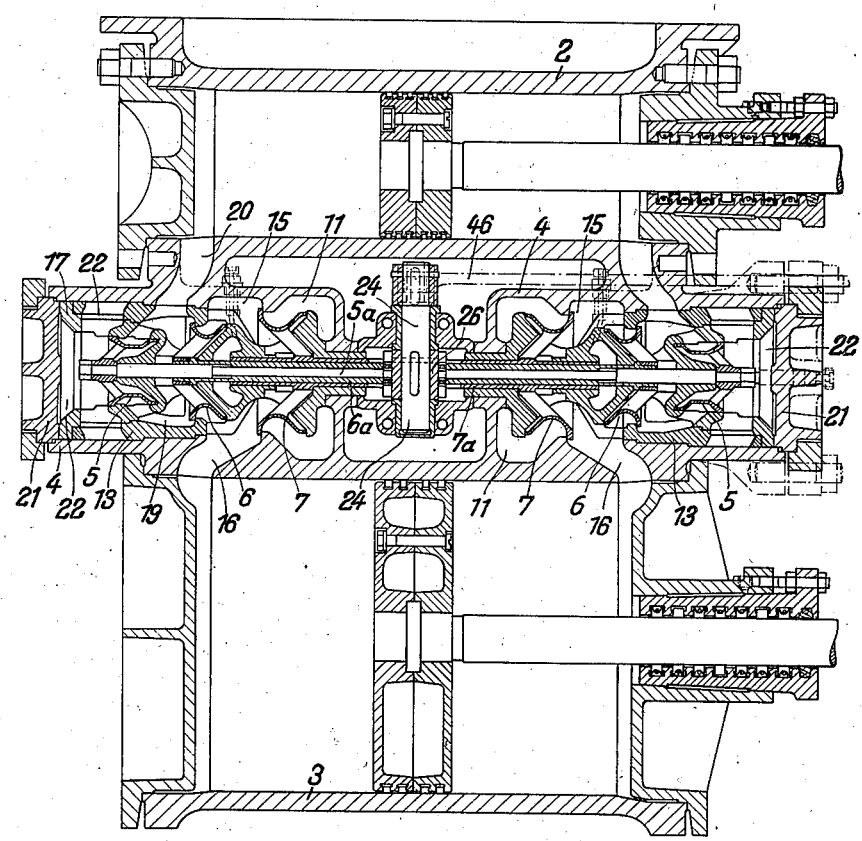
Fig. 1 is a longitudinal section on line I—I of Fig. 2 through the high pressure cylinder, the low pressure cylinder and the valve chest interposed between these two cylinders of a compound steam engine of the Woolf type with control drive actuated in the middle.

The form of construction illustrated in Figs. 1 to 4 will first be described.

1 is a cylinder block of a compound engine with a high pressure cylinder 2 and a low pressure cylinder 3. At each end of the cylinder block a valve chest 4 is cast between the two cylinders, the feed and exhaust passages for the steam leading into this chest. In each valve chest an admission valve 5, a by-pass valve 6 and an exhaust valve 7, are arranged coaxially one behind the other and effect the steam distribution for one piston side of the two cylinders. For this purpose a cup-like member 9 is inserted in the end wall 8 of the valve chest and carries the lower seat of the exhaust valve 7. The upper seat of the exhaust valve is arranged on an inwardly projecting edge 10 of the valve chest 4. Radial slots 9' in the tapered part of the cup member 9 guide the ribs 7' of the exhaust valve 7 and prevent this valve from turning. The exhaust valve 7 shuts off a space 11 from the side of which an exhaust passage 12 extends.

The seats for the by-pass valve 6 are arranged on a valve cage 13 inserted in the valve chest 4. This cage can bear against the cup member 9 and has an annular extension 14 which engages in a central bore in the member 9. The inner part of the valve cage 13 is of smaller diameter than the outer part so that an annular space 15 remains between the by-pass valve 6 and the exhaust valve 7, said space being connected with a by-pass passage 16 leading to the low-pressure cylinder 3.

In the valve cage 13 a second valve cage 17 is arranged for the admission valve 5 constructed as a piston slide valve. The valve cage 17 has passages 18 which lead into an annular space 19 situated above the by-pass valve 6. A passage 20 leads from the annular space 19 to one end of the high-pressure cylinder 2.

A space 22 situated above the admission valve 5 and closed by a cover 21 is connected with the live steam conduit by a laterally arranged tubular connection 23 indicated in dotted lines in Fig. 2.

As already mentioned, the spindles of the valves are mounted one within the other. For this purpose the spindle 7a of the exhaust valve 7 is a hollow spindle, which is mounted at one end in a central bore 9" of the valve cage 9 and at its other end in a central bore 13' in an inserted member 13. The hollow spindle 7a accommodates the hollow spindle 6a of the by-pass valve 6 and in this hollow spindle 6a the spindle 5a of the admission valve 5 is mounted. The ends of the spindles project into the cam shaft chamber 25 in which the cam shaft 24 and the other elements serving for controlling the valves are arranged. The cam shaft 24 is oscillated in the usual manner by a rod system.

The gear drive comprises a combined cam keyed on the cam shaft 24 and carrying the cams for actuating all the valves.

The admission valve 5 of the high-pressure cylinder and the exhaust valve 7 of the low-pressure cylinder are actuated by the same cam 27. When this cam swings, it presses against an intermediate lever 28 oscillatable about an axis 28' and having a forked end. A middle finger 28a comes into contact with the end of the admission valve spindle 5a, whereas two outer fingers 28b come into contact with the end of the hollow spindle 7a.

On the other hand the by-pass valve 6 is actuated by a cam 26 which acts on an intermediate lever 29 oscillatable about an axle 29'.

The free end of the intermediate lever 29 is also forked. Its fingers 29a engage between the fingers of the intermediate lever 28 and act on the end of the spindle 6a of the by-pass valve.

As in this construction of the cam the lifting surfaces 27 lift the admission—and exhaust valves simultaneously, but the two valves must open at different times, the high-pressure admission valve 4 must be constructed as piston slide valve with a certain overlapping, so that it opens later than the exhaust valve 7. This presents the advantage that the acceleration of the admission valve takes place already before it opens, so that the admission passage is exposed very quickly and the steam can flow into the high pressure cylinder without being throttled.

To maintain the gear elements permanently in contact and to return the valves on to their seats, an elastic pressure medium such as steam acting on the valve spindles is employed instead of springs. For this purpose the following arrangement is provided:—

Firstly, a bore 32 is provided in the cover 21, to which wet steam or some other pressure medium is supplied through a conduit 31. This medium acts on a pressure piston 33 mounted in the bore 32, which piston is pressed against the spindle 5a of the admission valve into its closed position. With a view to maintain also the other valves 5 and 6 in closed position by steam pressure, the bottom of the valve cage 13 is constructed as a hollow body 34, the internal space 35 of which is connected by a bore 36 in one of the reinforcement ribs with a steam conduit 30. The space 35 communicates by means of a bore 37 in the hollow spindle 6a with an annular space 35a produced by reducing the spindle 5a of the admission valve from its normal diameter $d_1$ to a smaller diameter $d_2$. The admission valve spindle 5a is pressed towards the right by the closing pressure acting on it. It can therefore be regarded as a rigid counter bearing so that the pressure prevailing in the chamber 35a presses the spindle 6a of the by-pass valve 6 towards the right with a pressure which acts in the annular chamber formed between the diameters $d_1—d_2$. The steam pressure prevailing in the space 35 may also act on the end of spindle 7a of the exhaust valve. Thus, all the valves are maintained under closing pressure during the service.

The steam conduits 30 and 31 leading respectively to the chambers 32 and 35 are at the same time connected with a control valve 47 in a casing 46, the valve being adjustable from the driver's stand through a suitable rod, not shown, and a lever e and serving at the same time as starting and coasting pressure compensation device. The valve 47 has a passage f and controls four passages in the casing 46. Passage a is connected to the boiler of the engine, or to a compressed-air reservoir, by a pipe 53; the passages b and c are connected, respectively, to the conduits 30 and 31; and a vent passage d is connected to a discharge pipe d' opening into the atmosphere. In the coasting position, Fig. 15, the supply of medium under pressure through conduit 53 and passage a is closed by the valve 47, and the pipes 30 and 31 are connected to atmosphere. The valves brought into their open position by the cams then remain in this position, so that free communication is established between the two ends of the cylinder.

When starting a compound locomotive, it is found necessary to first supply steam only to the large surface of the low pressure piston, so as to obtain a stronger pulling moment, whereas the high pressure cylinder is only connected up later. This can be effected in a simple manner with the gear according to the invention by placing, when starting the control valve 47 into the position shown in Fig. 16. In this position, steam from passage a flows to the conduit 30 and the hollow space 35a. The vent passage d is closed. The pressure prevailing in the annular chamber 35a acts on the spindle 5a and brings the admission valve 5, as there is no counter-pressure, first into its open position. It then places the spindles 6a and 7a under pressure, so that the by-pass valve 6 and the exhaust valve 7 can operate normally. If the regulator is then slowly opened, the live steam passes from the chamber 22 through the opened admission valve 5 and the by-pass valve controlled by the cam, directly into the low-pressure cylinder 3 which, owing to the larger piston surface, can produce the power necessary for starting. When it is desired to change over to normal service, the control valve 47 is placed into the position illustrated in Fig. 17 in which passages b and c, and pipes 30 and 31, are connected to the supply passage a, and the vent passage d is closed. All valves are now under closing pressure.

Under certain circumstances, if the pressure surfaces are correspondingly proportioned, the pressure piston 33 can be entirely omitted in that, by gradually opening the regulator the increasing steam pressure acts on the spindle 5a of the admission valve until it is able to overcome the counterpressure in the annular chamber 35a acting on the same spindle. When this occurs the admission valve is automatically brought into the controlling position and the engine then operates in its normal manner.

Figure 5:
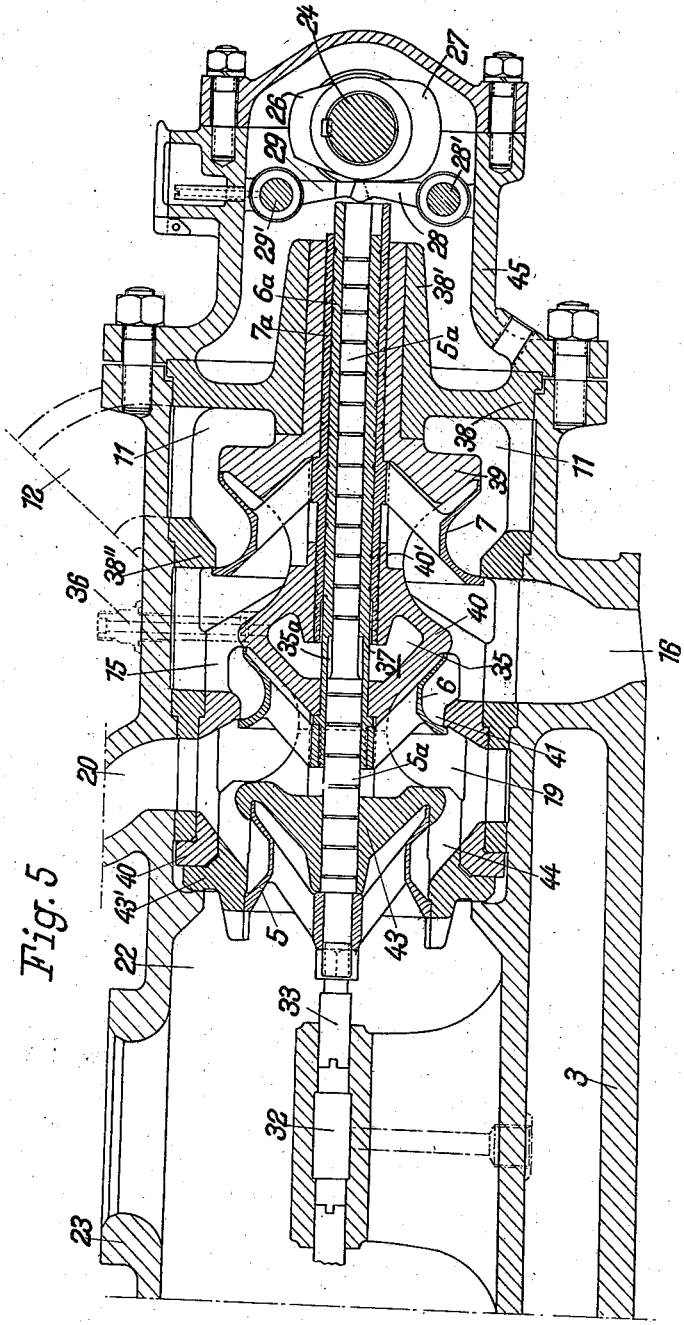
Fig. 5 is a longitudinal section through the valve chest and valve set of a compound engine of the Woolf type, in which a cam shaft is provided at each end of the cylinder block for controlling the valve set.

The form of gear shown in Fig. 5 differs substantially from that above described only in that the valve sets arranged on both ends of the cylinder block 1 are insertable as an aggregate into the bores of the valve chest 4 and the valves are controlled each by a shaft arranged at each end of the cylinders. In this instance each valve set comprises an insert member 38 adapted to be slipped into the bore in the valve chest, in the end wall of which provided with a hub 38' a cup 39 is inserted, which carries the lower seat for the exhaust valve 7. The other seat of the exhaust valve is arranged on an annular extension 38'' of the insert member 38.

A valve cage 40 for the by-pass valve 6 is fitted in the casing 38 from the rear side thereof and bears at one end against the inner edge of the insert member 38 and at its other end against the edge of the cup 39, this cage having an annular extension 40' which engages in the cup 39.

The valve cage 40, which carries the seats for the by-pass valve 6 has passages 41 which establish communication between the space 19 above the by-pass valve 6 and the annular space 15 between the by-pass valve 6 and the exhaust valve 7. A by-pass passage 16 branches from the space 15 and leads to the end of the low pressure cylinder 3.

A second valve cage 43 for the piston slide valve 5 is fitted in the valve cage 40. This valve cage 43 bears at its inner end against the bottom of the valve cage 40 constructed as a hollow body 35 and at its outer side has an edge 43' bearing against the edge of the valve cage 40. The admission valve 5 opens directly into the live steam space 22, to which live steam is supplied through the tubular connection 23. The admission valve 5 controls the passages 44 provided in the valve cage 43 which, when the valve is open, establishes connection between the live steam space 22 and the space 19, from which the by-pass passage 20 leading to the end of the high pressure cylinder branches. The spindles 5a, 6a, 7a of the three valves are mounted one within the other and are held in closed position by steam pressure in the same manner as in the form of construction first described, and they are controlled in the same manner by a cam shaft 24 which is, however, here journalled in a hollow cover 45 covering the bore of the valve chest 4 and at the same time securing the different inserted members in the valve chest.

This construction of gear presents the advantage that in the event of repairs, the whole valve set can be taken out, after the removal of the cover 45, and a fresh valve set inserted. The dismantling and fitting of the gear can therefore be carried out in a very short time.

The operation of the gear is the same in both forms of construction. If for example, the cam 27 moves out of its middle position towards the left, the exhaust valve 7 will first be opened and allows the exhaust steam to pass out of the low pressure cylinder 3 through the passage 16 into the exhaust space 11, from which it escapes through the tubular connection 12. Shortly thereafter the same cam 27 opens the admission valve 5, so that live steam can pass from the space 22 through the inflow passage 20 to the high-pressure cylinder 2 in which it expands after the closing of the admission valve 5. During this time the by-pass valve remains closed. Before the change of stroke and when the admission and exhaust valves are closed, the by-pass opens, so that partly expanded steam can pass from the high-pressure cylinder 2 through the passages 20 and 16 into the low-pressure cylinder, in which, after the closure of the by-pass valve, the steam expands to its final pressure. At the other end of the cylinder the same series of operations take place only displaced through a phase of 180°.

Figure 7:
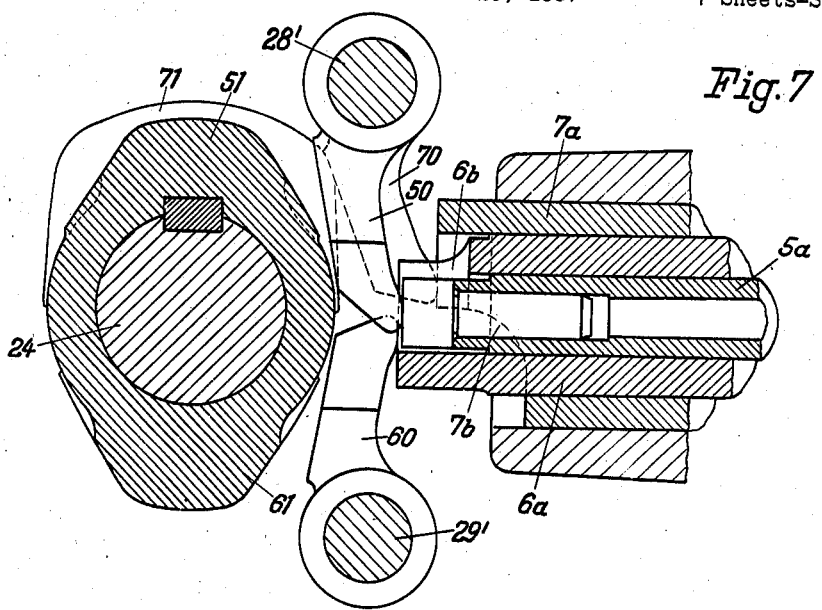
Fig. 7 is a section on line VII—VII of Fig. 6.
Figure 6:
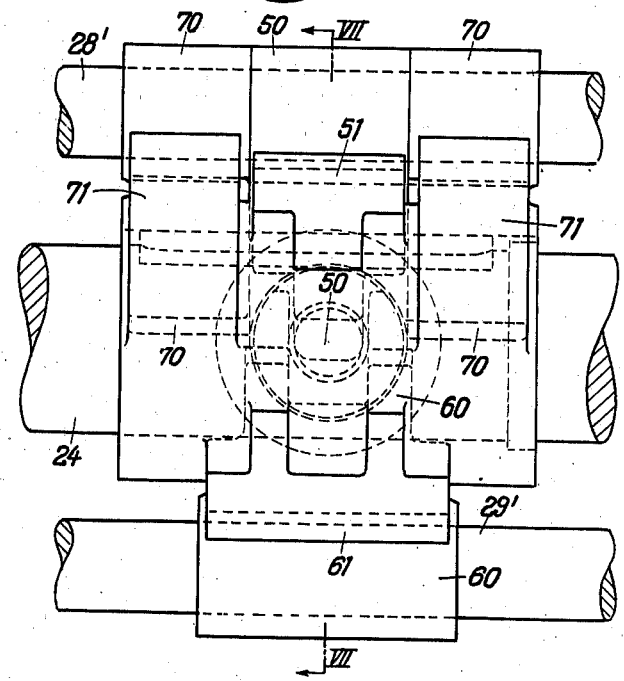
Fig. 6 is an elevation on a larger scale showing a combined cam acting on the valve spindles.

If the admission valve is not constructed as a piston slide valve but, like the other valves, as an ordinary double seated poppet valve, separate lifting surfaces are necessary for controlling the admission and inlet valves. In Figs. 6 and 7 such a gear drive is shown in section and elevation. The finger-shaped end of an intermediate lever 50, mounted on the axle 28 and actuated by a cam 51, bears against the end of the admission valve spindle 5a. To enable this intermediate lever 50 to swing out, the end of the spindle 6a of the by-pass valve 6 has an aperture 6b, through which the end of the intermediate lever 50 can pass. The forked end of an intermediate lever 60 mounted on the axle 29' and actuated by a cam 61 bears against the end of the spindle 6a of the by-pass valve 6. The spindle 7a of the exhaust valve 7, however, is controlled by two intermediate levers 70 mounted on the axle 28' and by two similarly shaped exhaust cams 71. The two intermediate levers 70 bear against the end of the spindle 7a above the middle plane of the spindle. The lower half of the spindle has an aperture 7b which allows the intermediate lever 60 to move without hindrance.

Figure 8:
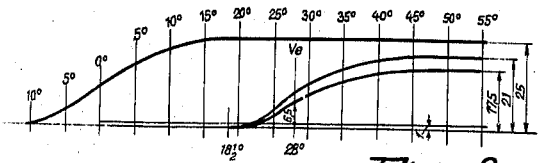
Fig. 8 is a diagram showing the curves of the valve lifts in dependency upon the crank angle.

The cams 51, 61 and 71 are in this instance cut from a block keyed on the cam shaft 24. Where necessary, apertures are provided in this block to enable the unimpeded adjustment of the intermediate levers. The control surface of the admission cam 51 lags slightly behind the control surface of the exhaust cam 71, so that the exhaust valve opens earlier than the admission valve as shown diagrammatically in Fig. 8 wherein the periodicity and extent of the valve lifts are indicated.

The block with the cams is also constructed symmetrically to the vertical medial plane so that the block can be employed for gears in which only one shaft is arranged in the middle of the cylinder and two shafts are provided at the cylinder ends.

In the gear above described the admission cam 51 is stationary relatively to the exhaust cam 71. In Figs. 9 to 12 a gear drive is shown which differs from that previously described only in that the admission cam 51 is adjustable relatively to the exhaust cam 61 for the purpose of varying the charge. For this purpose the shaft 24 is constructed as a hollow shaft, the cam block removed from between the exhaust cams 71, and in this recess thus formed the admission cam is turnably arranged, this admission cam being driven by a second shaft 24a mounted in the hollow shaft 24 and extending through a central bore therein and coupled therewith by projections engaging in longitudinal grooves in the shaft 24a.

Each of these shafts is separately driven. Consequently the admission cam can be displaced from the outside relatively to the exhaust cam, so that it opens sooner or later, which enables the steam distribution to be regulated within wide limits.

The kinds of gear above described employ double seated valves. The same gear drive can also be employed for single seated valves which are easier to produce and by which primarily the clearance can be kept very small. They are suitable for more slowly running marine steam engines. Figs. 13 and 14 show such a gear, wherein the valves are driven by a control drive according to Figs. 6 and 7. Therefore, the corresponding gear elements are designated by the same references. Consequently, it is not necessary to particularly describe this gear drive. Differing from the types of valve gear already described, the valves are constructed as cone-shaped single-seat valves 52, 62 and 72. The by-pass valve 62 and the low-pressure exhaust valve 72 are provided with flanges 63 and 73, respectively, mounted to slide in bores 64 and 74, respectively, of the valve casings 13 and 4, respectively. The stroke of the valves is equal to the width of the corresponding by-pass passages 16 and 20. Fig. 14 shows the full-open position of the by-pass valve 62 in which the flange 63 of the valve enters the bore 64 and the steam flows through the by-pass passage 16 from the high-pressure cylinder to the low-pressure cylinder without being throttled. The low-pressure exhaust valve 72 in its full-open position enters the bore 74 with its flange 73 so that the exhaust steam flows in the passage 20 without being throttled.

Of the nested valve spindles 5a, 6a and 7a the latter is guided on an insert member 48. The spindles 6a and 7a are secured against turning by a key 49 which engages in longitudinal grooves in these spindles.

To maintain the valves in closed position it is sufficient in this instance to connect the internal space 55 of the gear housing with an evacuated space (for example to a condenser) by means of a conduit 56.

We claim:—

1. A compound steam engine of the Woolf type with valve gear, comprising in combination a cylinder block having a high pressure cylinder and a low pressure cylinder, sets of valves arranged at each end of said block, each set comprising an admission valve, a by-pass valve and an exhaust valve said valves arranged coaxially one behind the other, valve spindles one carrying each of said valves and mounted one within the other, and a combined cam adapted to control said sets of valves.

2. A compound steam engine as specified in claim 1, in which the combined cam is composed of two relatively adjustable parts, one part having a control surface for the admission, and the other the control surfaces for the by-pass and exhaust valves, and the two parts are each driven by a cam shaft.

3. A compound steam engine as specified in claim 1, in which the combined cam is driven by a cam shaft and a control surface adapted to control both the exhaust valve and the admission valve for the high-pressure cylinder and said admission valve is constructed as piston slide valve adapted to open later than said exhaust valve.

4. In a compound steam engine as specified in claim 1, in each valve set a valve cage carrying the by-pass valve, a valve cage carrying the admission valve and mounted in said by-pass valve cage, a bottom on said by-pass valve cage constructed as a hollow body, and means for supplying steam to said hollow body to exert closing pressure on the spindles of said by-pass and exhaust valves.

5. In a compound steam engine as specified in claim 1, in each valve set a valve cage carrying the by-pass valve, a valve cage carrying the admission valve and mounted in said by-pass valve cage, a bottom on said by-pass valve cage constructed as a hollow body, and means for supplying steam to said hollow body to exert closing pressure on the spindles of said by-pass and admission valves, the spindle of the admission valve mounted in the tubular spindle of the by-pass valve being reduced to a smaller diameter and forming with the tubular spindle of the by-pass valve a chamber communicating with the space in said hollow body through a bore in the tubular spindle.

6. In a compound steam engine as specified in claim 1, in each valve set a valve cage carrying the by-pass valve, a valve cage carrying the admission valve and mounted in said by-pass valve cage, a bottom on said by-pass valve cage constructed as a hollow body, and means for supplying steam to said hollow body to exert closing pressure on the spindles of said by-pass and admission valves, the spindle of the admission valve mounted in the tubular spindle of the by-pass valve being reduced to a smaller diameter and forming with the tubular spindle of the by-pass valve a chamber communicating with the space in said hollow body through a bore in the tubular spindle, a pressure piston subjected to the influence of a pressure medium and adapted to act on said admission valve spindle, and a cover plate having a bore coaxial with said spindles and accommodating said piston.

7. A compound steam engine of the Woolf type with valve gear, comprising in combination a cylinder block having a high pressure cylinder and a low pressure cylinder, sets of valves arranged at each end of said block, each set comprising an admission valve, a by-pass valve and and exhaust valve, said valves arranged co-axially one behind the other, valve spindles one carrying each of said valves and mounted one within the other, a combined cam adapted to control said sets of valves, a hollow seat for the by-pass valve, a cover plate having a bore, a piston on the outer end of the admission-valve spindle mounted to slide in the bore, a reduced portion on the admission-valve spindle defining an annular chamber between this spindle and the tubular spindle of the by-pass valve which chamber communicates with the interior of the hollow seat through the tubular spindle, a casing, conduits connecting the casing to a supply of fluid under pressure, to the cylinder, and to the interior of the hollow seat, a vent on the casing, and a manually operated control valve in the casing for controlling the conduits and the vent.

HUGO LENTZ.
HUGO JOHANNES LENTZ.